United States Patent [19]
Tanioka

[11] Patent Number: 6,002,841
[45] Date of Patent: *Dec. 14, 1999

[54] APPARATUS AND METHOD FOR PROCESSING IMAGE WHICH ADDS IDENTIFICATION INFORMATION TO BE EASILY DECIPHERABLE IN HIGH RESOLUTION IMAGE

[75] Inventor: Hiroshi Tanioka, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/879,137

[22] Filed: Jun. 19, 1997

Related U.S. Application Data

[63] Continuation of application No. 08/653,742, May 23, 1996, abandoned.

[30] Foreign Application Priority Data

May 31, 1995 [JP] Japan .................................. 7-134232

[51] Int. Cl.$^6$ ........................... G06K 9/36; G06K 15/02; H04N 1/387; H04N 1/50
[52] U.S. Cl. .......................... 395/109; 358/501; 399/366; 382/251; 382/276
[58] Field of Search ..................................... 382/276, 251; 358/501, 530, 401, 443, 448, 450; 399/366; 395/109

[56] References Cited

U.S. PATENT DOCUMENTS 5,257,119  10/1993  Funada et al. .......................... 358/450
5,444,518   8/1995  Hashiguchi et al. .................... 399/366

*Primary Examiner*—Scott Rogers
*Attorney, Agent, or Firm*—Fitzpatrick, Cella, Harper & Scinto

[57] ABSTRACT

An image processing method and an apparatus using the method enable information to be added particularly to a two-valued image having a high resolution so that the information can be read reliably. In a counter section of the apparatus, clock pulses with respect to the main scanning direction and clock pulses with respect to the sub scanning direction are counted as an 8-bit yellow component density image signal is input, and a determination is made as to whether the position at which mark M is to be added has been reached and as to whether, if the addition position is reached, the present position is a position at which a modulation amount α(=255) is to be added to the image signal or a position at which a modulation amount β is to be subtracted from the image signal. The result of this determination is output to a selecting device. The selecting device is supplied with the input Y component density image signal and two signals obtained by modulating this signal with the modulation amounts α and β and outputs one of the three input signals according to the determination result.

33 Claims, 14 Drawing Sheets

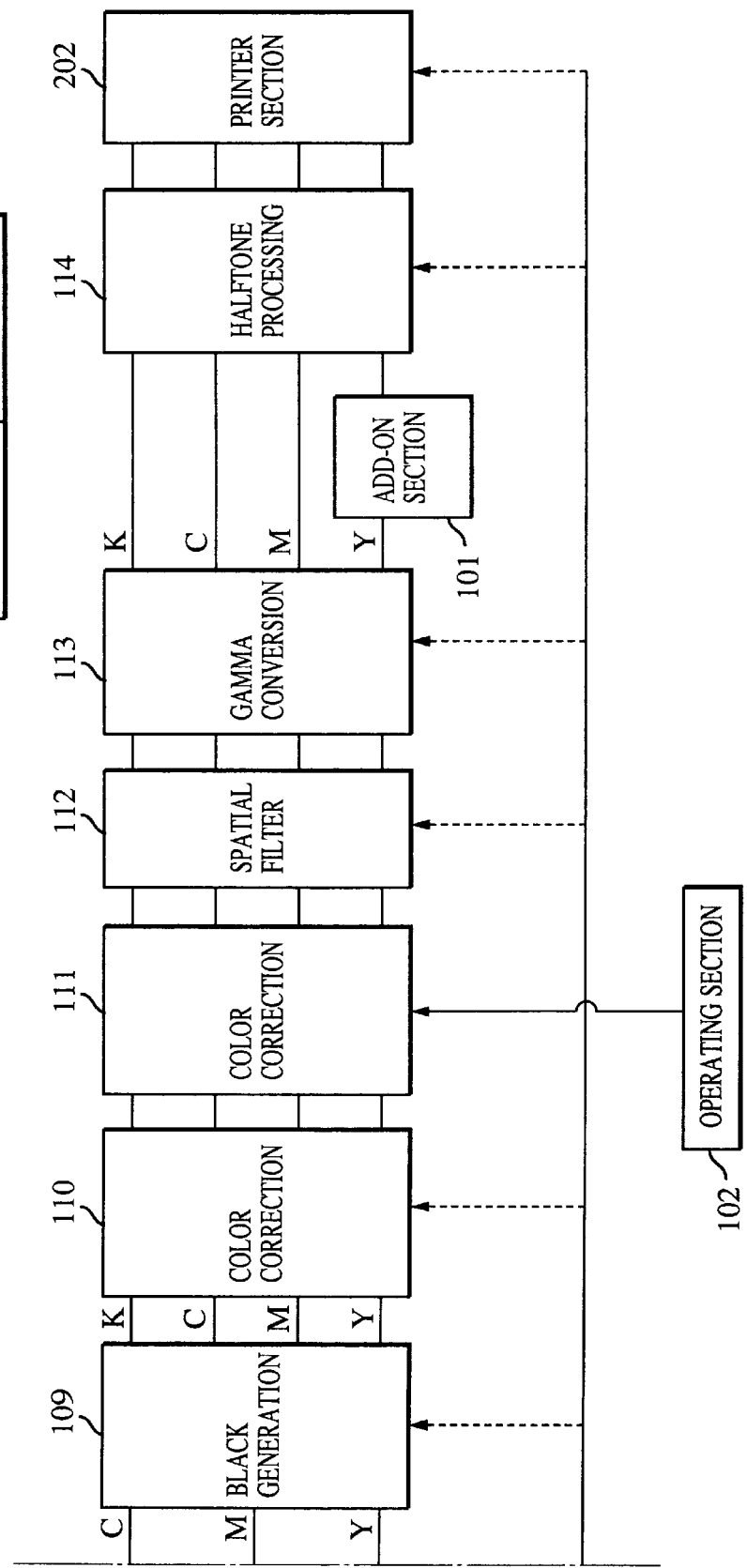

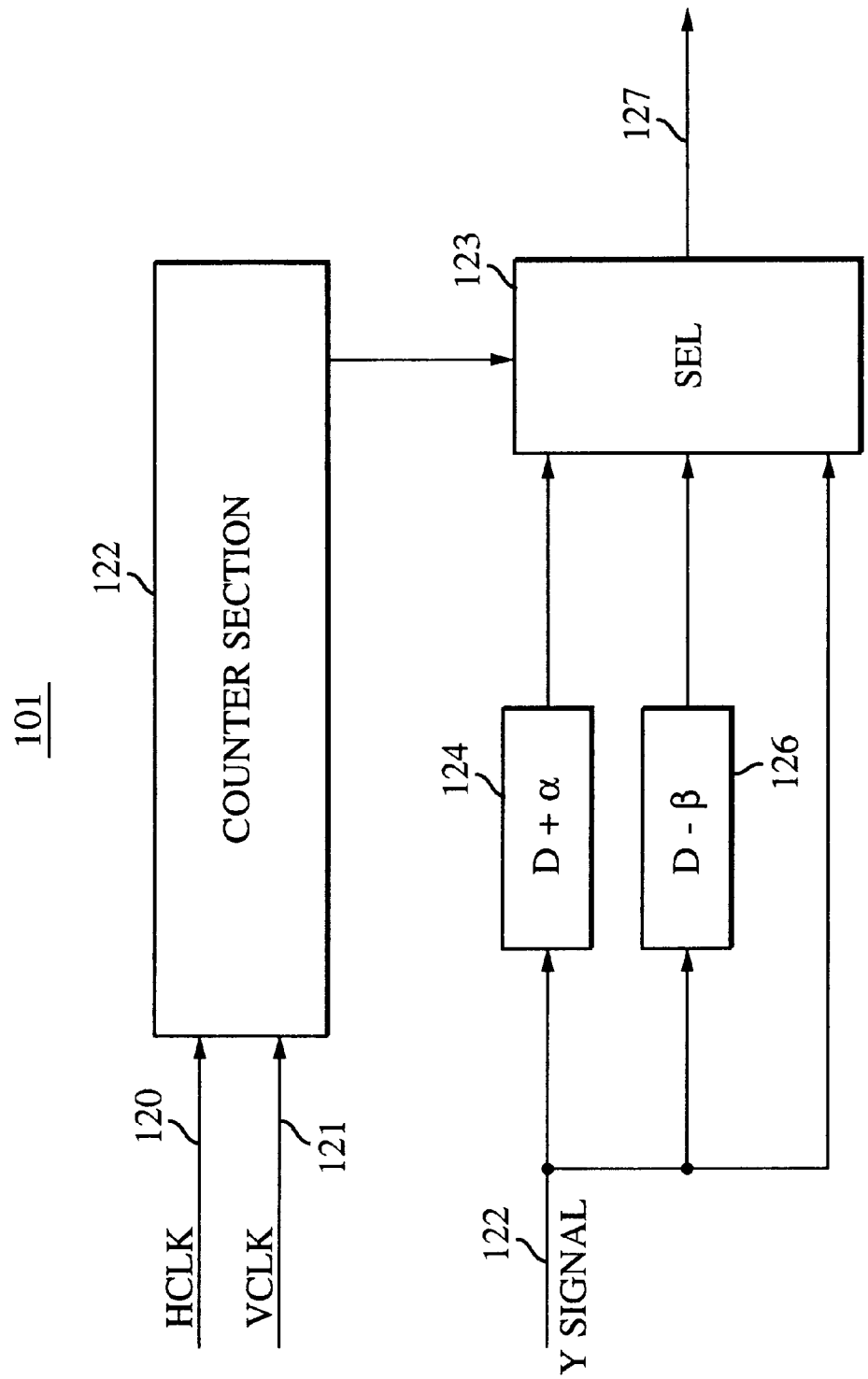

FIG. 6(d)

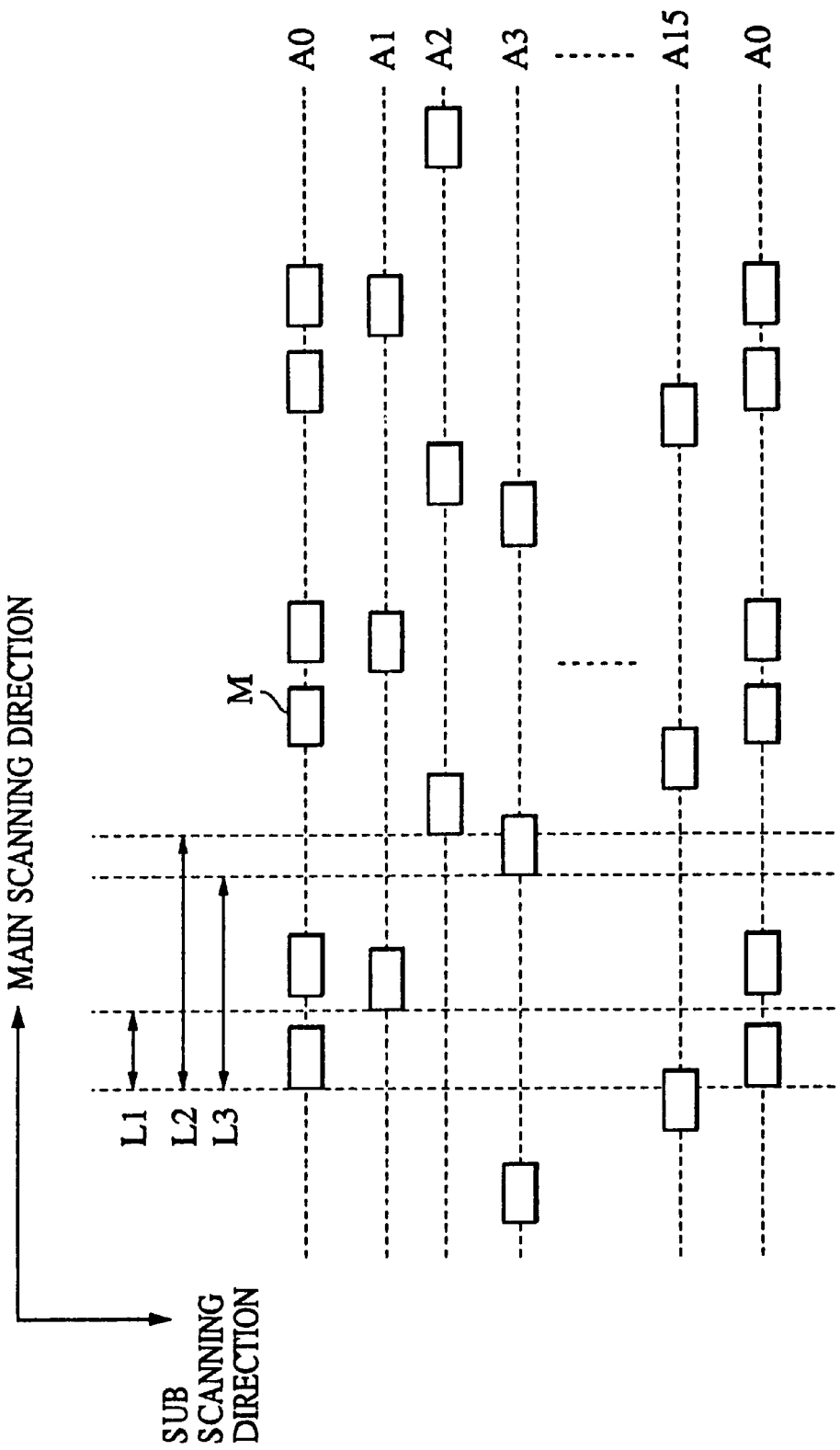

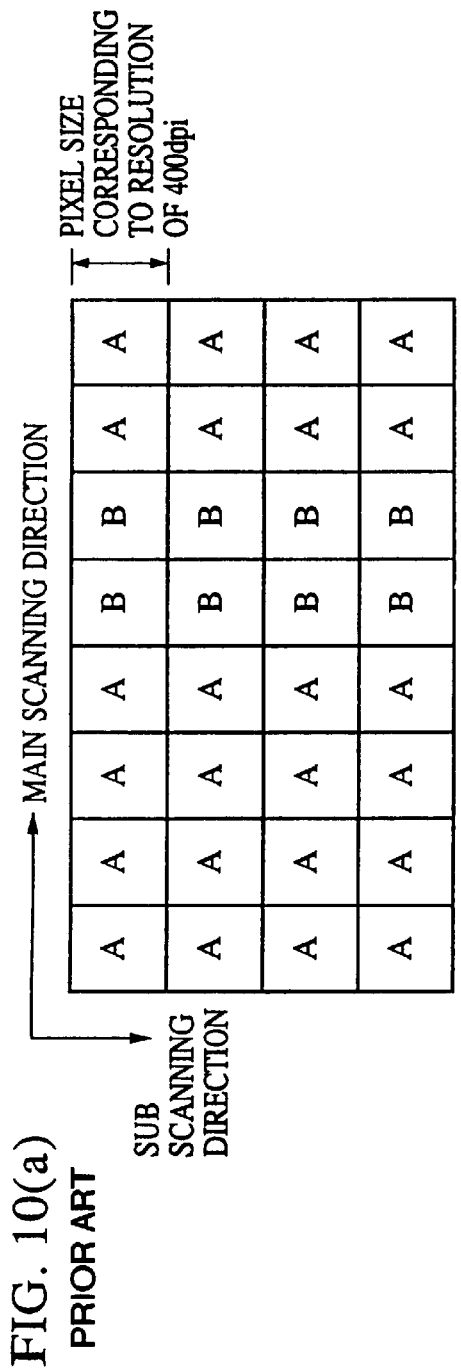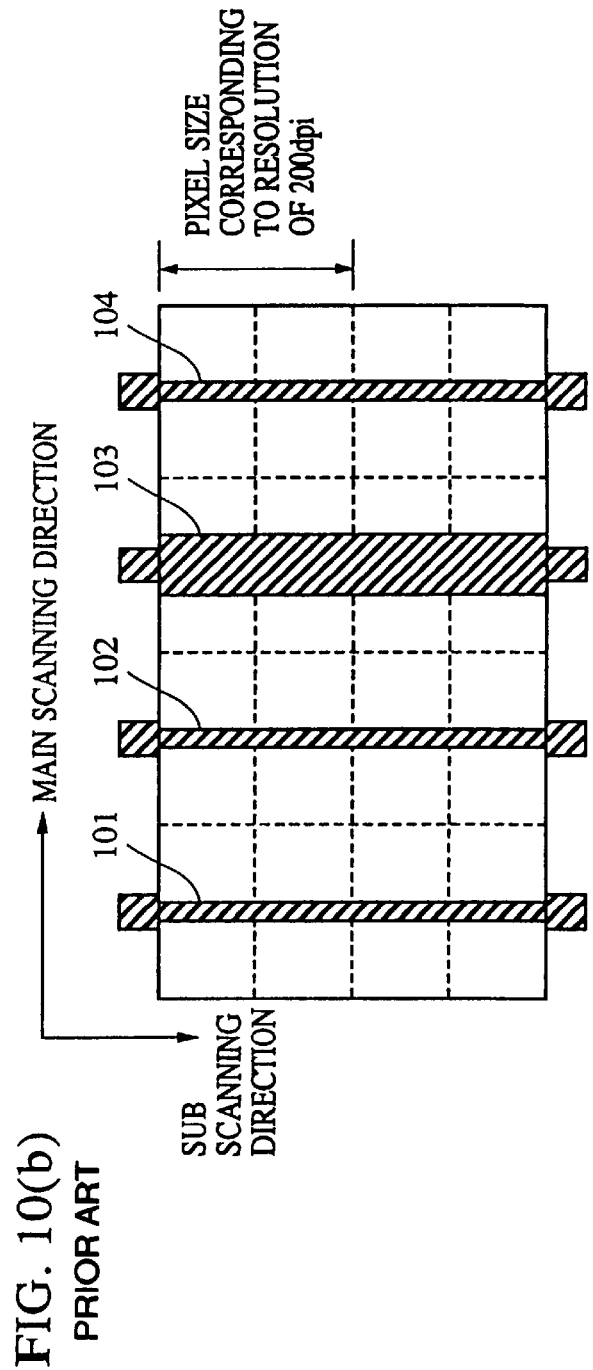
FIG. 10(a) PRIOR ART
FIG. 10(b) PRIOR ART

APPARATUS AND METHOD FOR PROCESSING IMAGE WHICH ADDS IDENTIFICATION INFORMATION TO BE EASILY DECIPHERABLE IN HIGH RESOLUTION IMAGE

This application is a continuation of application Ser. No. 08/653,742, filed on May 23, 1996, now abandoned.

BACKGROUND OF THE INVENTION

1. Field of the Invention

The present invention relates to an image processing method and an apparatus for processing images in accordance with a certain method and, more particularly, to a method and apparatus for performing image processing, for example, in a copying machine, a facsimile machine or a printer to add special information indicating the kind of machine, a serial number and the like, to a recorded image.

2. Description of the Related Art

A method of adding information representing a kind of machine, a serial number, and the like to a formed image has been practiced mainly with respect to image processing apparatuses, such as copying machines, in which an image signal is formed by pulse width modulation and an image is formed by electrophotography, as described in U.S. Pat. No. 5,257,119 and U.S. Ser. No. 9735 (filed on Jan. 27, 1993).

With respect to an apparatus used only for binary image recording and incapable of forming a halftone image, a method has been practiced in which the distance between pixels in a formed image are slightly changed to add information corresponding to the kind of machine and a serial number or the like.

FIG. 9 is a diagram for explaining an information addition method conventionally practiced. This conventional method will be described with respect to the case of pulse-width modulating an image signal originally expressed at a resolution of 400 dpi to form a multivalued image at a resolution of 200 dpi.

According to this conventional art, information is expressed by combinations of marks formed on sixteen lines (marker lines) A0 to A15 disposed at predetermined intervals on a formed image. Information is added to a formed image by forming such combination patterns reiteratively and periodically in the sub scanning direction (recording medium transport direction) on the formed image.

As shown in FIG. 9, marks M having a predetermined size (e.g., 8 (in the main scanning direction: laser light scanning direction)×4 (in the sub scanning direction) pixels) are reiteratively arranged at certain intervals on each line. Specifically, the number of marks M on line A0 from which one cycle of mark patterns starts is twice the number of marks on the other lines. On this line, pairs of marks M are disposed so that the subsequent one in each pair follows immediately after the preceding one, thereby making it possible to recognize the lines through which one cycle or one set of information is expressed. To accurately decipher information recorded in this manner when the information is read out afterward, an image signal is formed so as to express each mark M in a rectangular form of 32 (8×4) pixels at a resolution of 400 dpi.

Information is expressed with such marks M as described below.

This is, as shown in FIG. 9, information is expressed by the distance (L1, L2, L3, . . . ) from the left end of the left one of an adjacent pair of marks M on top line A0 to the left ends of the nearest marks M on the subsequent lines (A1, A2, A3, . . . ) in the main scanning direction.

FIGS. 10(*a*) and 10(*b*) are diagrams of an image signal for expressing one mark M conventionally used and a mark M thereby formed. FIG. 10(*a*) shows the configuration of an image signal for expressing mark M and FIG. 10(*b*) shows a pattern of mark M formed in an image on a recording medium on the basis of the image signal expressed as shown in FIG. 10(*a*). As shown in FIG. 10(*a*), mark M is formed by an image signal forming 8 pixels in the main scanning direction and 4 pixels in the sub scanning direction, i.e., a total of 32 pixels on condition that the resolution is 400 dpi.

With respect to pixels "A" in the total of 32 pixels of the image signal as shown in FIG. 10(*a*), a predetermined value $\beta$ level is subtracted from the density value of the original image signal ($-\beta$) while with respect to pixels "B" a predetermined value $\alpha$ level is added to the original image signal ($+\alpha$). With respect to the image signal thus modulated, image formation is effected by pulse width modulation so as to have a resolution of 200 dpi such that two pixels in the main scanning direction and one pixel in the sub scanning direction, i.e., two pixels, form one pixel at 200 dpi. A pattern of mark M such as that shown in FIG. 10(*b*) is thereby obtained if the density value of the original image signal in mark M is uniform through the 32 pixels thereof.

That is, mark M is formed of a set of four recording lines 101 to 104. Recording lines 101, 102, and 104 are thinner (lower in density) than the surrounding ones. Conversely, recording line 103 is thicker (higher in density). Therefore, the above-mentioned distances L1, L2, L3, . . . are obtained as the relationship between the positions of thicker recording lines 103. If the modulation value of the image signal is larger, the resulting marks are easier to read but become conspicuous in an ordinary image. Therefore, optimal values of $\alpha$ and $\beta$ are empirically determined.

If the image formed on the recording medium in this manner is read, for example with a scanner having a resolution of 400 dpi, the marks can be correctly read and the read image is analyzed to identify the machine that has formed the image.

However, with the advancement of the image processing technology relating to pulse width modulation and electrophotography, the resolution of image forming apparatuses such as printers, for example, those for forming two-valued images only has been increased to 400 dpi, to 600 dpi, to 800 dpi, . . . In other words, the distance between pixels has become very small, so that it is difficult to decipher added information from formed images.

This problem will be described with respect to the case of forming marks M by an apparatus for forming only two-valued images at a resolution of 600 dpi. If marks M are formed so as to have the same size as that of marks M each having 8 pixels in the main scanning direction and 4 pixels in the sub scanning direction, i.e., a total of 32 pixels at a resolution of 400 dpi as shown in FIG. 10(*a*) (or 4 pixels in the main scanning direction and 2 pixels in the sub scanning direction, i.e., a total of 8 pixels) by, for example, two-valuing with a modulation signal such as that shown in FIG. 10(*a*) by an error diffusion method or the like, while preserving the same density, and if $\alpha$=40, then the total addition value (total amount of modulation) in the area indicated by "B" in FIG. 10(*a*) is 40*8=320. In this case, if the image signal is expressed by 8 bits with respect to each pixel (density value: 0 to 255), and if the density value designated by the original image signal of the region to which each mark M is added is "0", the area of "B" has an increase in recording dots relative to the surrounding areas, which is at most about a 1.3 dot (320=255*1.255) with respect to the total amount of modulation. As a result, the essential effect of adding marks M cannot be achieved.

Therefore, there is a need to prepare a modulation signal for 12 pixels in the main scanning direction and 6 pixels in the sub scanning direction, i.e., a total of 72 pixels in order to form marks M, as shown in FIG. 11(a). If the image signal on which this modulation signal is superimposed are two-valued for image formation by an error diffusion method or the like, so that the overall density is preserved, and if α=40, then the total addition value (total amount of modulation) in the area indicated by "B" in FIG. 11(a) is 40*18=720. In this case, if the image signal is expressed by 8 bits with respect to each pixel (density value: 0 to 255), and if the density value designated by the original image signal of the region to which each mark M is added is "0", two-valued recording dots corresponding to an amount of about 3 dots (720= 255*2.823) are newly formed with respect to the total amount of modulation.

However, the positions of three dots 105, 106, and 107 newly formed as three of 18 pixels represented by "B" as shown in FIG. 11(b) cannot be specified because they are changed according to the values of the original signal and the two-valuing method used. Also, a situation may occur in which dots 105, 106, and 107 cannot be discriminated from dots expressing a texture and existing around dots 105, 106, and 107.

As described above, marks M cannot be correctly read from a two-valued image formed at a high resolution when the image is read with a scanner or the like, so that added information cannot be deciphered. Thus, the essential purpose of adding information to an image to identify the apparatus used to form the image has become difficult to attain.

A similar problem is encountered in the case where input image data is multivalued data as well as in the case where input image data is two-valued image data.

SUMMARY OF THE INVENTION

In view of the above-described problem, an object of the present invention is to provide an image processing method enabling information to be added particularly to a two-valued image having a high resolution so as to be easily decipherable and an image processing apparatus for processing in accordance with the method.

Another object of the present invention is to provide an apparatus and a method enabling information to be suitably added to two-valued image data.

Still another object of the present invention is to provide a novel method of adding information.

To achieve this object, according to one aspect of the present invention, there is provided an image processing apparatus comprising input means for inputting multivalued digital image data, quantization means for quantizing the multivalued image data, and addition means for adding predetermined information to an image expressed by the image data quantized by the quantization means, wherein the addition means adds the predetermined information so that the position of at least one pixel expressing the added information is not changed due to the quantization performed by the quantization means.

According to another aspect of the present invention, there is provided an image processing method comprising an input step of inputting multivalued digital image data, a quantization step of quantizing the multivalued image data; and an addition step of adding predetermined information to an image expressed by the image data quanitized in the quantization step, wherein, in the addition step, the predetermined information is added so that a position of at least one pixel expressing the added information is not changed due to the quantization in the quantization step.

According to still another aspect of the present invention, there is provided an image processing apparatus comprising input means for inputting image data and addition means for adding predetermined information to an image expressed by the image data, wherein the addition means adds the predetermined information by using a combination of a substantially maximum density value and a substantially minimum density value expressible by the image data.

According to a further aspect of the present invention, there is provided an image processing method comprising an input step of inputting image data, and an addition step of adding predetermined information to an image expressed by the image data, wherein, in the addition step, the predetermined information is added by using a combination of a substantially maximum density value and a substantially minimum density value expressible by the image data.

These and other objects, and features of the present invention will become apparent from the following detailed description of the invention with reference to the accompanying drawings.

BRIEF DESCRIPTION OF THE DRAWINGS

FIG. 2 is a schematic block diagram showing the relationship between FIGS. 2A and 2B; FIGS. 2A and 2B are block diagrams;

FIG. 3 is a block diagram of add-on section 101;

FIG. 9 is a diagram of an information addition method conventionally practiced;

FIGS. 10(a) and 10(b) are diagrams of an image signal expressing one mark which is conventionally used and a mark formed by the image signal.

DESCRIPTION OF THE PREFERRED EMBODIMENT

A preferred embodiment of the present invention will be described below in detail with reference to the accompanying drawings.

In the embodiment described below, an electrophotographic multicolor copying machine is used as an image processing apparatus representing the present invention. However, the present invention can, of course, be applied to image processing apparatus using a silver salt photography system, a thermal transfer system, a sublimation type system, an ink jet system and other image forming systems.

[Outline of the Apparatus (FIG. 1)]

Figure 1:
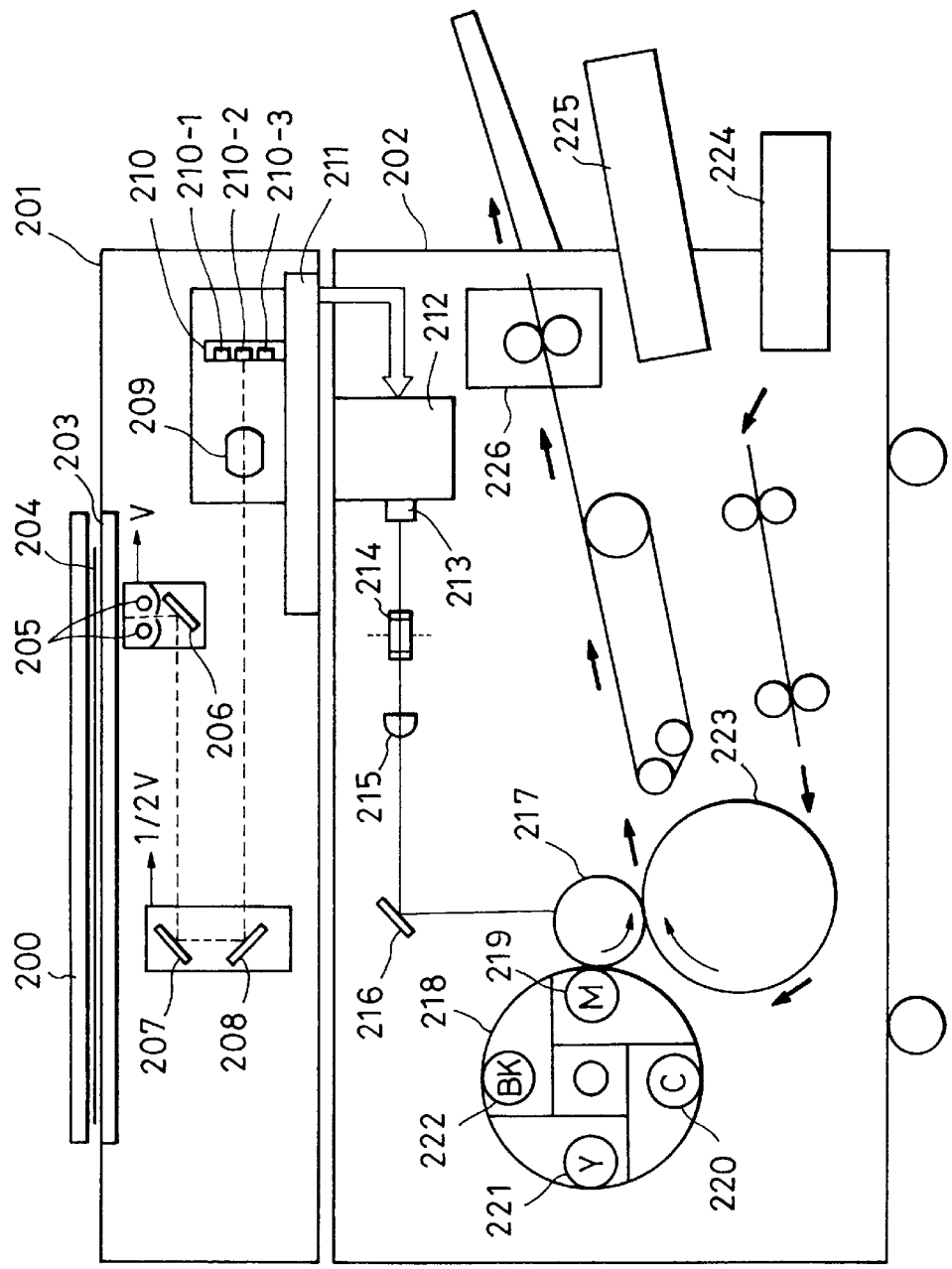
FIG. 1 is a sectional side view of an electrophotographic multicolor copying machine in accordance with an embodiment of the present invention.

FIG. 1 is a sectional side view of the construction of the embodiment of the present invention, i.e., a multicolor copying machine capable of gradation expression by processing color image data in a pseudo halftone processing manner. As shown in FIG. 1, the copying machine has an image scanner section 201 in which an original is read at a resolution of 600 dpi and the read data is processed in a digital signal processing manner. The copying machine also has a printer section 202 from which an image corresponding to the original image read by the image scanner section 201 is output by being printed on a paper sheet at a resolution of 600 dpi.

In the image scanner section 201, an original 204 placed on an original table glass (platen) 203 and held by a mirror-finished pressure plate 200 is irradiated with a lamp 205. Light reflected by the original 204 travels to a lens 209 by being guided by mirrors 206, 207, and 208 and is imaged on a 3-line sensor (charge coupled device (CCD)) 210 by the lens 209 to be decomposed into red (R), green (G) and blue (B) components as full-color information. Signals representing the brightnesses of these components (hereinafter referred to as brightness signals) are sent to a signal processing section 211. A carriage 227 on which the lamp 205 and the mirror 206 are fixed is mechanically moved at a speed v in a direction perpendicular to an electrical scanner (main scanning) direction of the 3-line sensor 210 while the mirrors 207 and 208 are mechanically moved at a speed of v/2 in the same direction, thereby scanning (sub-scanning) the entire surface of the original.

In the signal processing section 211, the read image signals are electrically processed to be decomposed into components of magenta (M), cyan (C), yellow (Y) and black (BK), which are sent to the printer section 202. By one cycle of scanning the original with the image scanner 201, one of the components M, C, Y and Bk is sent to the printer section 202. Accordingly, one image print is completed by four cycles of original scanning.

Image signals M, C, Y, and Bk sent from the image scanner section 201 are supplied to a laser driver 212. The laser driver 212 drives a semiconductor laser 213 by modulating a drive signal in accordance with the supplied image signals. A surface of a photosensitive drum 217 is scanned with laser light traveling from the semiconductor laser 213 via a polygon mirror 214, an f-θ lens 215 and a mirror 216. A rotary development device 28 is formed of a magenta development section 219, a cyan development section 220, a yellow development section 221, and a black development section 222. These four development sections alternately contact the photosensitive drum 217 to develop an electrostatic latent image formed on the photosensitive drum 217. A paper sheet supplied from a paper cassette 224 or 225 is wrapped around a transfer drum 223. The image developed on the photosensitive drum 217 is transferred onto the paper sheet wrapped around the transfer drum 223.

After the four colors, i.e., magenta (M), cyan (C), yellow (Y) and black (Bk) have been transferred successively, the paper sheet passes a fixation unit 226 to fix toners on the paper sheet, and is thereafter discharged.

[Image Scanner Section (FIG. 2)]

Figure 2A:
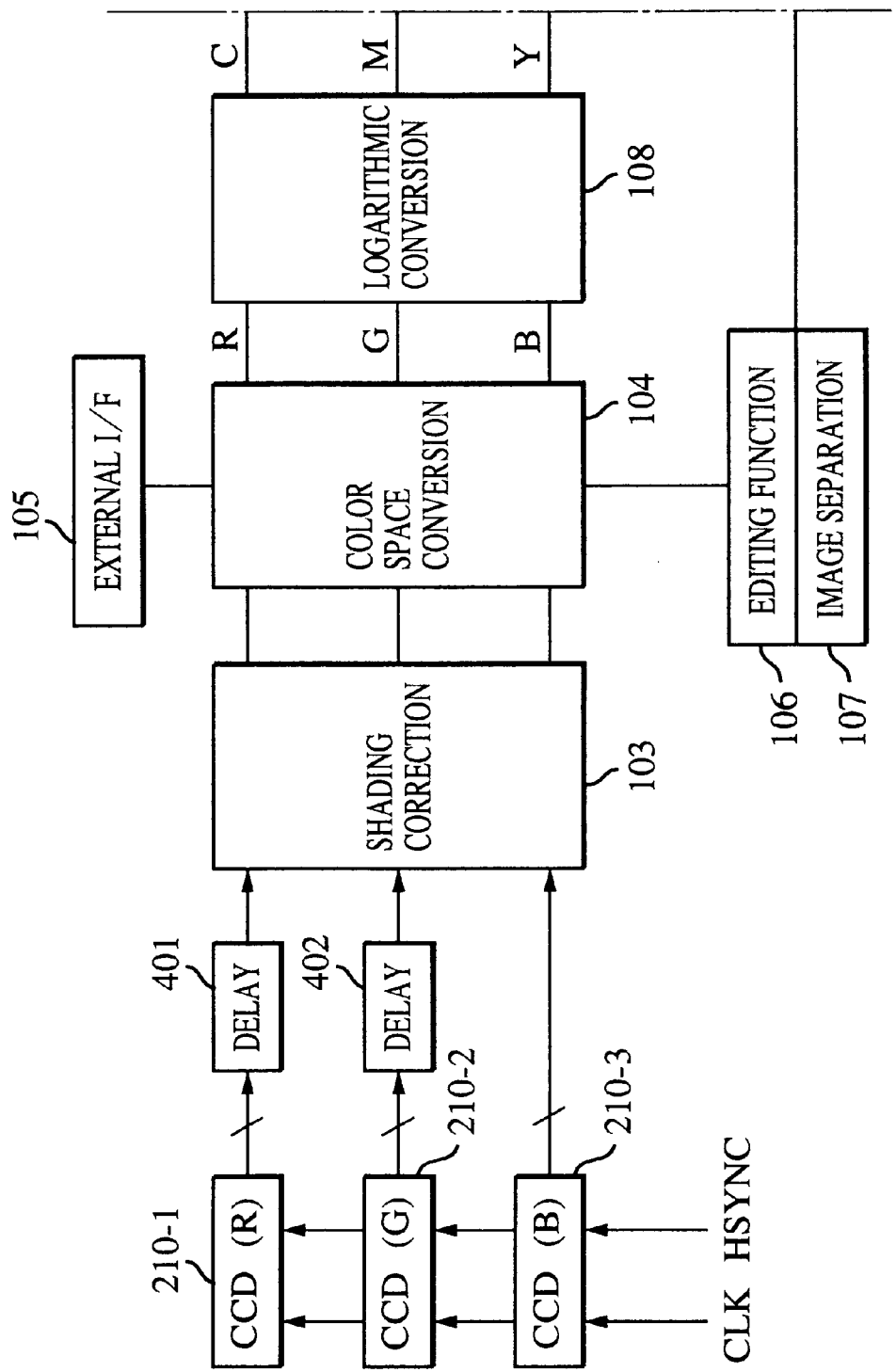

FIGS. 2A and 2B are block diagrams of the image scanner section 201. Blocks 210-1, 210-2, and 210-3 in FIG. 2 represent CCD (solid-state image pickup devices) line sensors having spectral sensitivity characteristics with respect to red (R), green (G) and blue (B). These line sensors are incorporated in the 3-line sensor 210. Image signals read by the 3-line sensor 210 are converted from an analog form into a digital form to be output as 8-bit signals corresponding to the color components. Accordingly, the R, G and B components are expressed by levels of 0 to 255 (each by 8-bit expression).

The CCD line sensors 201-1, 210-2, and 210-3 used in accordance with the present invention are disposed at a certain distance one from another. Therefore, spatial differences therebetween are corrected by delay elements 401 and 402.

Unevenness of the image signals read by the 3-line sensor 210 is uniformly corrected by a shading correction circuit 103. Also, color correction of sensor filters of the 3-line sensor 210 are made in a color space conversion circuit 104.

Next, the corrected R, G and B brightness signals are converted into C, M and Y density signals in a logarithmic conversion section 108. A black (Bk) signal is formed from the density signals by a black generation circuit 109 which executes under color removal (UCR) and masking processing. These density signals representing the densities of the four color components (C, M, Y, Bk) are color-corrected in a color correction circuit 110 according to characteristics of the recording agent (toner) color materials and other conditions. These signals undergo, if necessary, magnification or reduction processing performed by a magnification/reduction circuit 111 in accordance with a ratio designated by an operating section 102. Further, in a spatial filter 112, correction of sharpness and removal of moiré are performed. Density adjustment is performed in a gamma correction section 113.

In this embodiment, additional information described below is added to the Y component density signal in the gamma-corrected density signals by an add-on section 101. The Y component density signal to which the additional information has been added is input to a halftone processing section 114. On the other hand, the density signals of the C, M, and Bk components are directly input to the half-tone processing section 114 from the gamma correction section 113. The density signals input to the halftone processing section 114 undergo pseudo halftone processing based on a dither method or an error diffusion method to be two-valued. Two-valued signals thereby obtained are output to the printer section 202 to form an image.

An image separation section 106 performs image recognition processing to discriminate the kinds of image (e.g., literal image, figure image, natural image and the like) expressed by the input image signal. An editing function section 107 executes various editing processing for repeated copying, zooming, trimming, etc. and instructs and controls other sections of the copying machine.

The multicolor copying machine of this embodiment also has an external interface (I/F) 105 through which image signals can be input from an external unit. For example, R, G and B image signals formed by a host computer can be input to obtain an output from the printer section 202. Also, a communication control unit (not shown) can be connected to the external interface (I/F) 105 to receive through a communication circuit an image signal transmitted from a facsimile machine installed in a remote place. An image is formed from the facsimile image signal and output from the printer section 202.

That is, inputs to the multicolor copying machine of this embodiment are not limited to those from the image scanner section 201 provided as an image input source, and image signals transmitted from a host computer or through a communication line can also be used as an image input source.

[Adding on Information (FIGS. 3 to 8)]

The addition of information executed by the add-on section 101 will now be described. As a combination of marks (FIG. 9), additional information provided by the manufacturer or provider of the machine to identify the machine, e.g. information indicating the kind of machine and a serial number or the like, is added to a formed image as a pattern of a yellow component, such as to be difficult to recognize by the human eye.

Figure 4A:
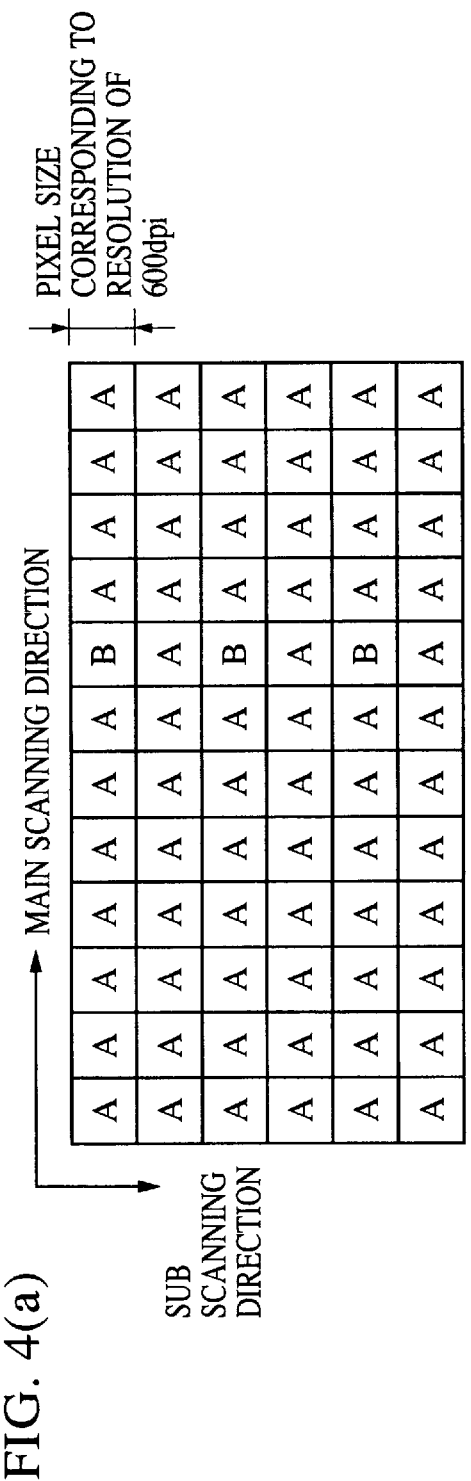
FIGS. 4(a) and 4(b) are diagrams showing a modulation signal for adding mark M at a resolution of 600 dpi and dots expressing two-valued mark M.

FIG. 3 is a block diagram of the configuration of the add-on section 101. In the add-on section 101, a modulation signal expressing marks M in a cycle such as shown in FIG. 9 with respect to the related conventional art is added to the yellow (Y) density signal by considering the significance of additional information. Image modulation data used to form each mark corresponds to 12 pixels in the main scanning direction and 6 pixels in the sub scanning direction, i.e., a total of 72 pixels at a resolution of 600 dpi, as shown in FIG. 4(a). Symbols "A" and "B" attached to the pixels have the same significance as those described above with respect to the conventional art.

Referring to FIG. 3, a counter section 122 supplied with clock (HCLK) 120 with respect to the main scanning direction and clock (VCLK) 121 with respect to the sub scanning direction counts and detects the positions of added marks M and its internal pixel positions. The counter section 122 determines whether yellow (Y) density signal 125 presently input corresponds to the position (mark portion) at which mark M is to be added while counting the number of clock pulses of HCLK 120 and VCLK 121. If the signal corresponds to the mark portion, the counter section 122 determines whether the signal corresponds to the position "A" of "B", and outputs the result of this determination to a selecting device (SEL) 123.

On the other hand, an adder 124 is supplied with yellow (Y) density signal 125 in synchronization with HCLK 120 and VCLK 121, and adds a preset modulation value α to the density value (D) of the input yellow (Y) density signal 125. If the result (D+α) of this addition exceeds "255", the adder 124 clamps the value at "255". An adder 126 is also supplied with yellow (Y) density signal 125 in synchronization with HCLK 120 and VCLK 121, and subtracts a preset modulation value β from the density value (D) of the input yellow (Y) density signal 125. If the result (D−β) of this subtraction is negative, the adder 126 clamps the value at "0". The results of the operations performed by the adders 124 and 126 are output to the selecting device (SEL) 123. Further, the density value (D) of yellow (Y) density signal 125 is supplied directly to the selecting device (SEL) 123.

Figure 4B:
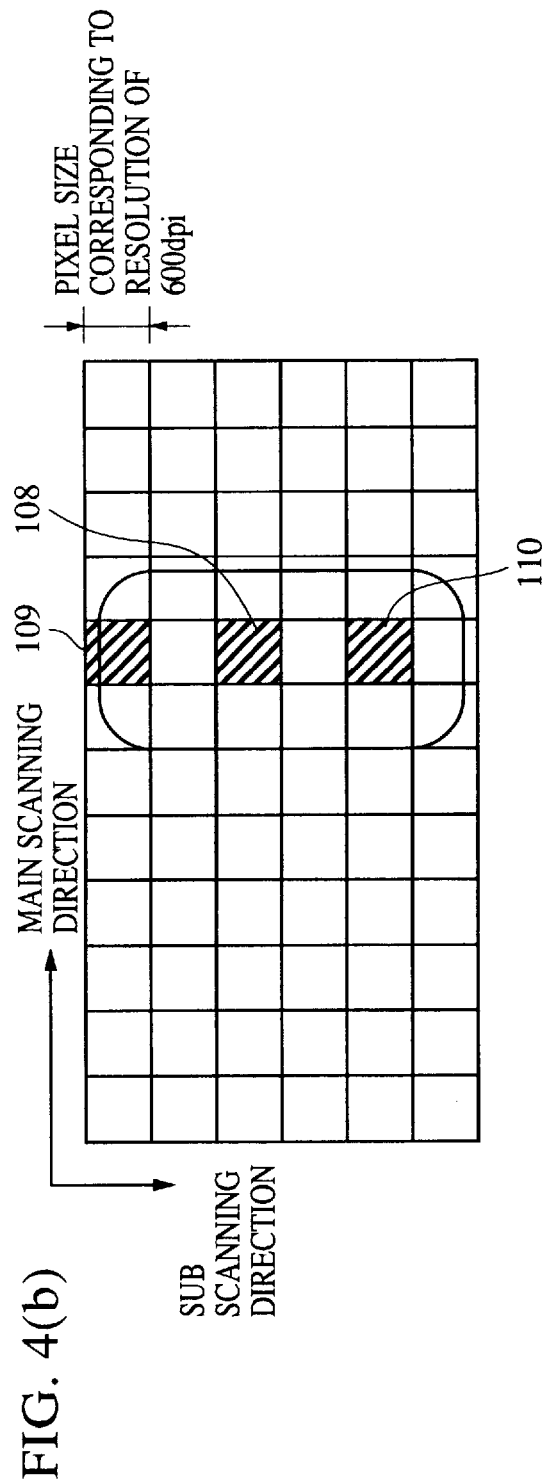
Figure 5A:
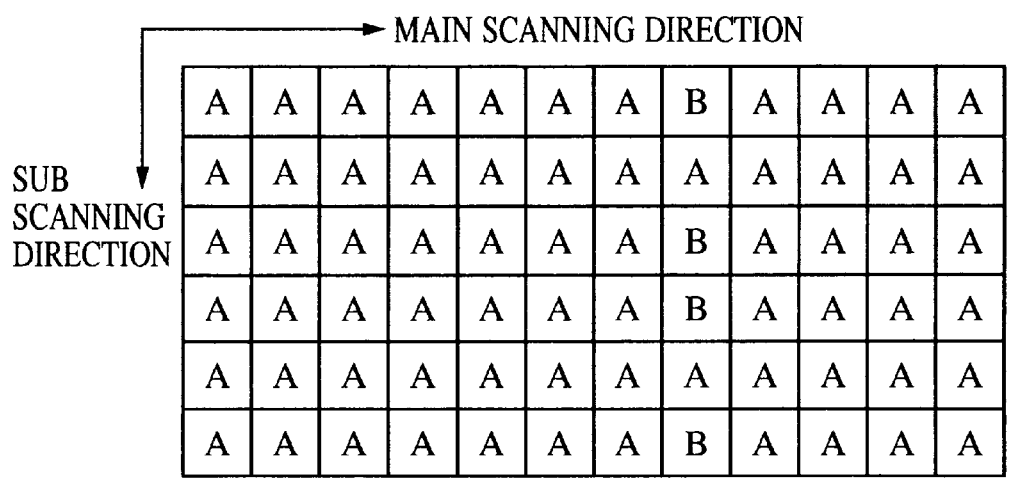
FIGS. 5(a) and 5(b) are diagrams showing other examples of the modulation signal for adding mark M at a resolution of 600 dpi and dots expressing two-valued mark M.
Figure 5B:
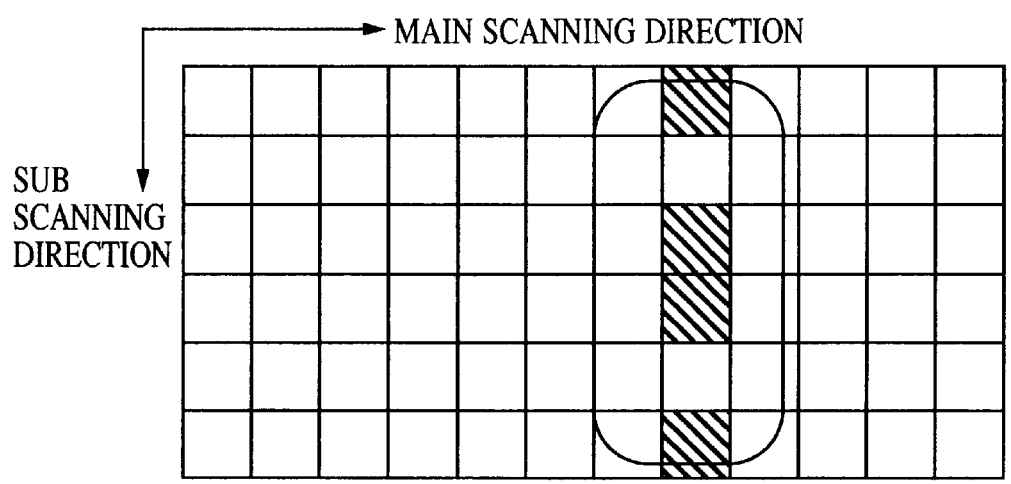
Figure 5C:
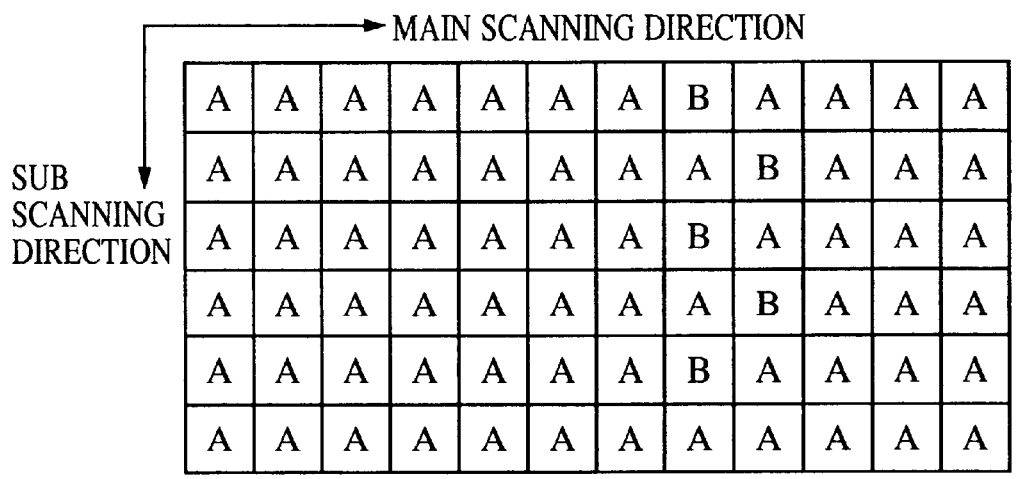
Figure 5D:
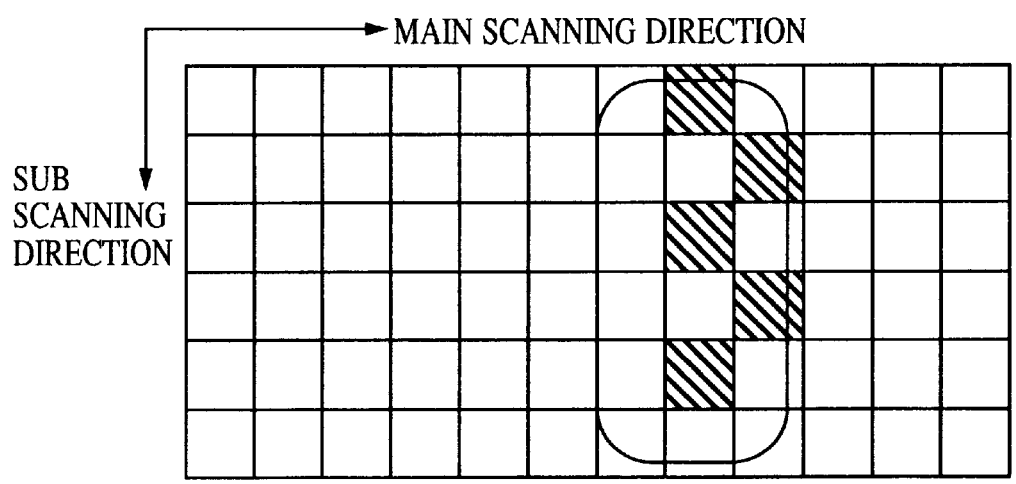

In this embodiment, the modulation value α is set to the maximum density value "255" in order that three dots corresponding to "B" pixels of the modulated image signal forming each mark M be always formed fixedly at pixel positions 108, 109, and 110 indicated by hatched areas in FIG. 4(b). This setting of the modulation value ensures a constant positional relationship between the pixel positions 108, 109, and 110 of the three dots shown in FIG. 4(b), irrespective of the density value of the input image signal.

If the dots representing the position of each mark M are formed in this manner, the mark M formation position is constant, so that, when the formed image is read with a scanner or the like to decipher information added by using marks M, the information can be reliably read and deciphered.

The selecting device (SEL) 123 selects and outputs one of the three input density signals according to the determination result output from the counter section 122. That is, the selecting device (SEL) 123 selects the density value (D) of yellow (Y) density signal 125 with respect to pixels not corresponding to mark K, selects the output (D−β) of the adder 126 at the pixel positions corresponding to "A" of mark M, and selects the output (D+α) of the adder 124 at the pixel positions corresponding to "B" of mark M. The selecting device 123 outputs the selection result to the halftone processing section 114.

Thus, according to this embodiment, marks M can be added at predetermined positions in a two-valued image undergoing pseudo halftone processing irrespective of the value of an input multivalued image signal. The add-on section for adding marks M is a simple circuit formed of a counter, adders and a selecting device, so that information can be added at a low cost.

In this embodiment, multivalued density data of the yellow (Y) component is processed to add marks M. However, the present invention is not limited to this. For example, marks may be formed by processing two-valued image data instead of processing multivalued density data in such a manner that after two-valuing the image data, the image signal is thinned out at a predetermined rate with respect to the pixel positions "A" while dots are uniformly added with respect to the pixel positions "B".

The dot pattern added as mark M is not limited to the example shown in FIG. 4. Any other dot patterns may be used provided that a plurality of added dots are in a predetermined positional relationship and that the added dot pattern is clearly different from other dot patterns expressing halftones. Modulations signals and patterns for forming marks, such as those shown in FIGS. 5 and 6, may also be used. FIGS. 5(a) to 5(d) show other examples of mark M when the resolution of the formed image is 600 dpi, in which the number of recording dots is increased to 4 and to 5.

FIGS. 6(a) to 6(d) show other examples of dot patterns added as mark M. These examples are particularly effective when the input image signal is a two-valued image signal. "Black" pixels correspond to "B" in FIG. 5 while "white" pixels corresponds to "A" of FIG. 5. In particular, if the input signal is a two-valued image signal, "black" pixels are always recorded as black dots regardless of the image signal while "white" pixels are always recorded as white dots.

Pixels which are not "black"- or "white"-labeled are pixels representing the input image.

Figure 6A:
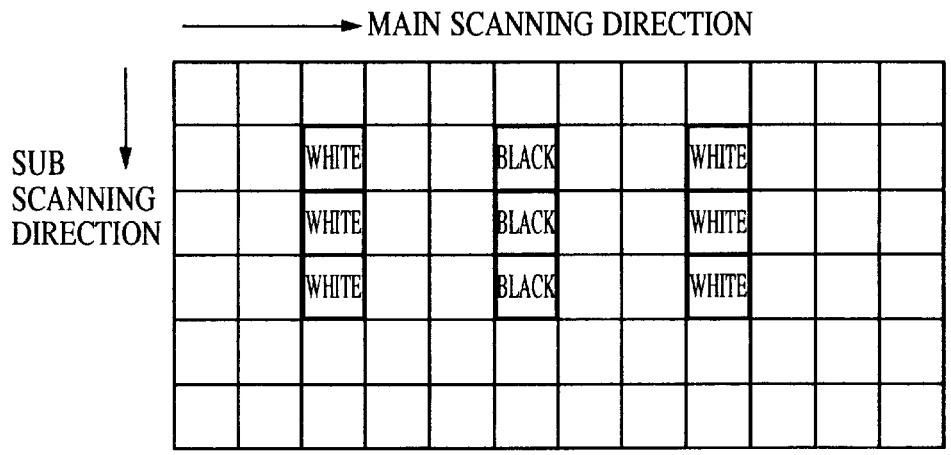
FIGS. 6(a) and 6(d) are diagrams showing other examples of the modulation signal for adding mark M at a resolution of 600 dpi and dots expressing two-valued mark M.

Referring to FIG. 6(a), a plurality of pixels (three pixels in this example) expressing substantial "black" are disposed successively, thereby avoiding the disappearance of black dots even if the resolution is high and enabling marks M to be recognized without failure. The number of successive pixels in the sub scanning direction can be selected as desired.

Also, a plurality of pixels expressing substantial "white" are disposed successively in the sub scanning direction at such a position as to be spaced apart from the "black" pixels with some rows of pixels interposed therebetween, thereby limiting the change in density due to the formation of the "black" pixels. The "black" pixels and "white" pixels are positioned so as not to be adjacent to each other, thereby preventing mark M from being easily recognized with the human eye.

Figure 6B:
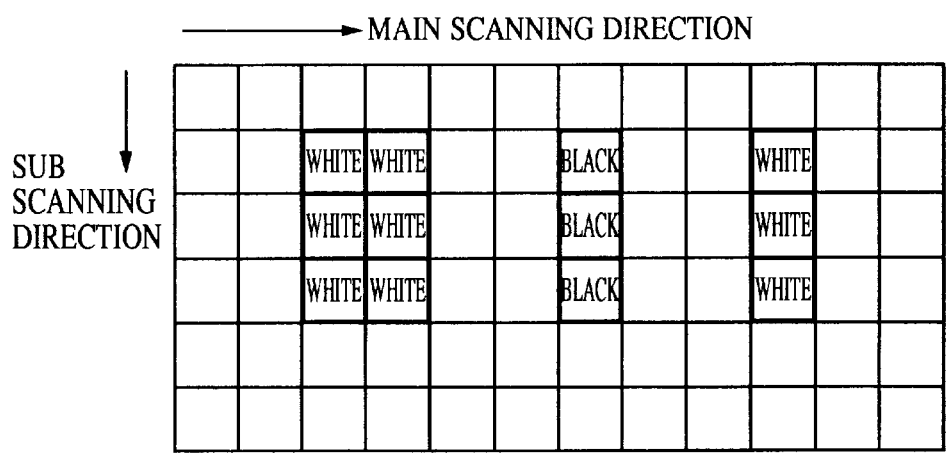

In the example shown in FIG. 6(b), one of two rows of "white" pixels on the opposite sides of "black" pixels is thickened. If "white" pixels are unbalanced in such a manner, an orientation of mark M can be specified, thereby improving the reliability with which discrimination information based on combinations of marks M (FIG. 9) is recognized.

Figure 6C:
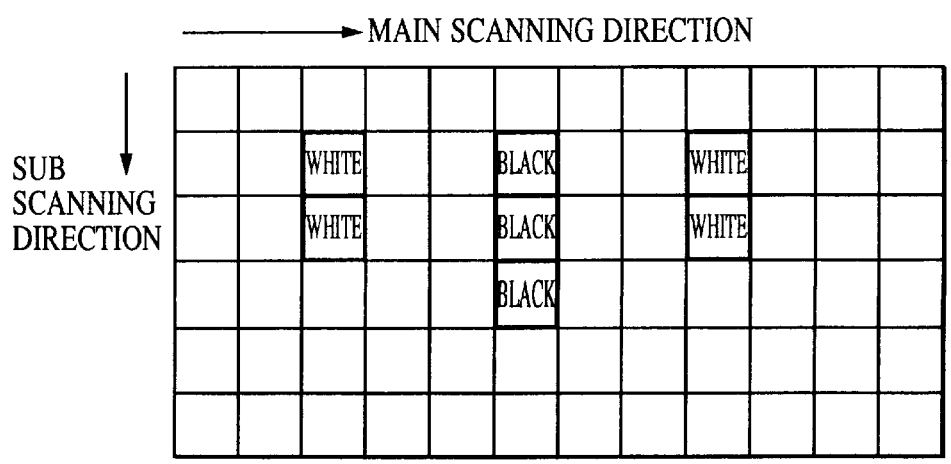

In the example shown in FIG. 6(c), the number (area) of "white" pixels is reduced in comparison with that in the example shown in FIG. 6(a). Since substantial "white" pixels are conspicuous in a dense image, a deterioration in image quality due to "white" pixels may be prevented in this manner.

Figure 6D:
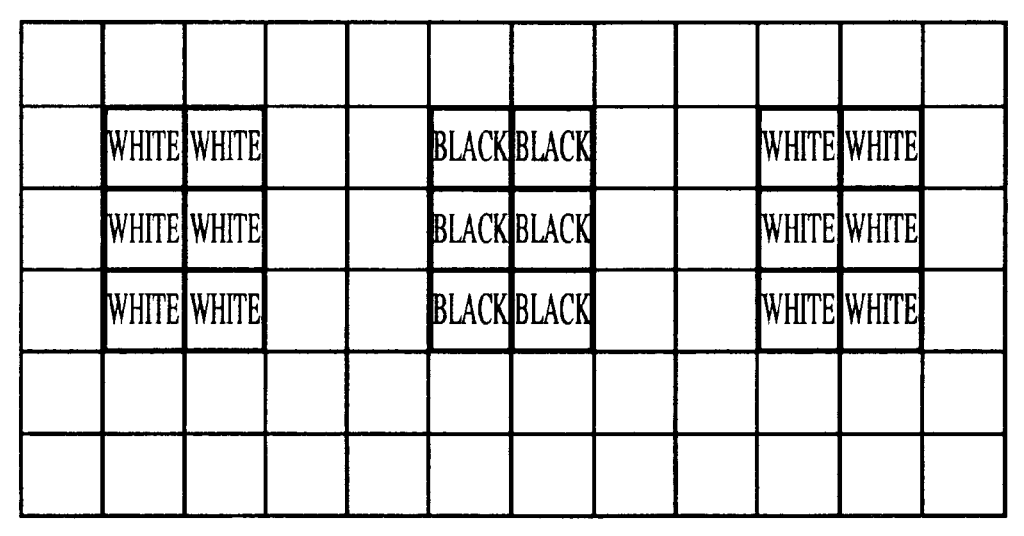

In the example shown in FIG. 6(d), the width of each of the rows of "white" pixels and the row of "black" pixels in the main scanning direction is increased, thereby enabling added information to be recognized without failure even if the resolution is high.

A combination of substantial "black" and "white" pixels such as one of those described above enables marks to be reliably added if the input image represents a two-valued image, particularly an image processed by systematic dither processing.

The present invention is also effective in a recording apparatus which has a resolution of 600 dpi and which performs pulse width modulation (PWM) recording with a period corresponding to three successive recording pixels. In particular, a mark very similar to that used in two-value recording can be added and printed at one determinate position by substituting it for recording signals of the maximum density (255) and the minimum density (0), irrespective of whether the input image signal is two-valued or multivalued. Further, the present invention makes it possible to stably add decipherable information without imposing any restrictions on the resolution and the recording method.

Figure 7:
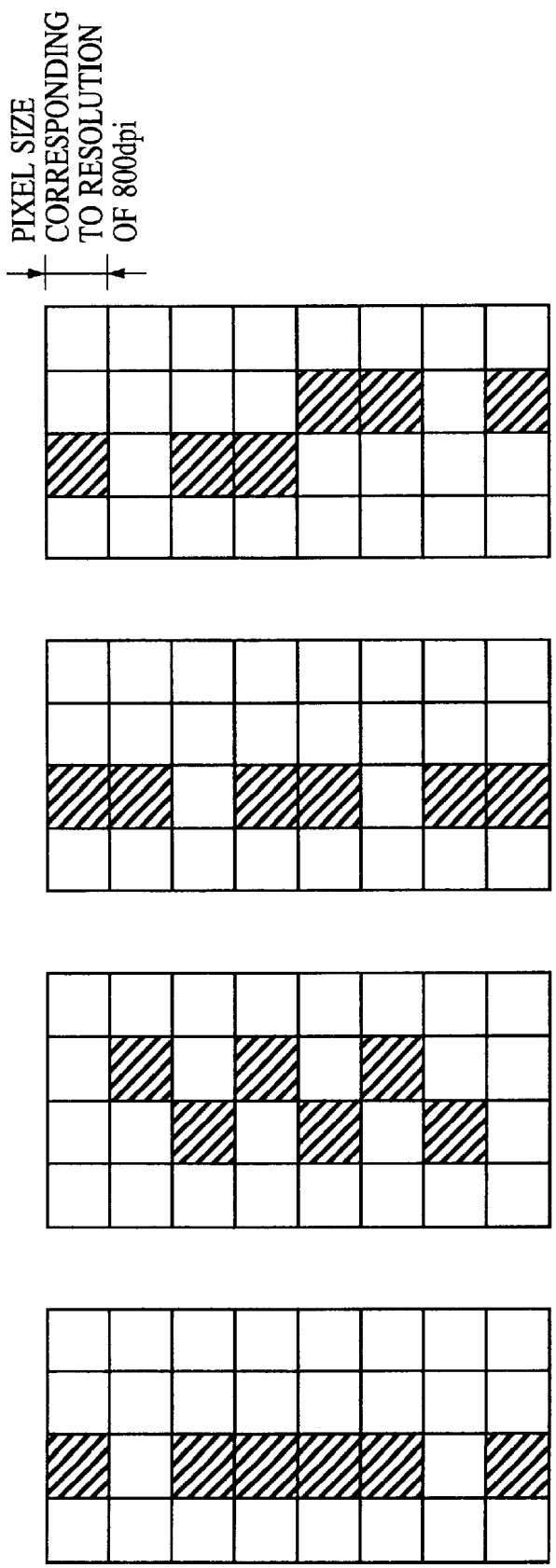
FIG. 7 is a diagram showing formed images of mark M in the case where the resolution is 800 dpi.
Figure 8:
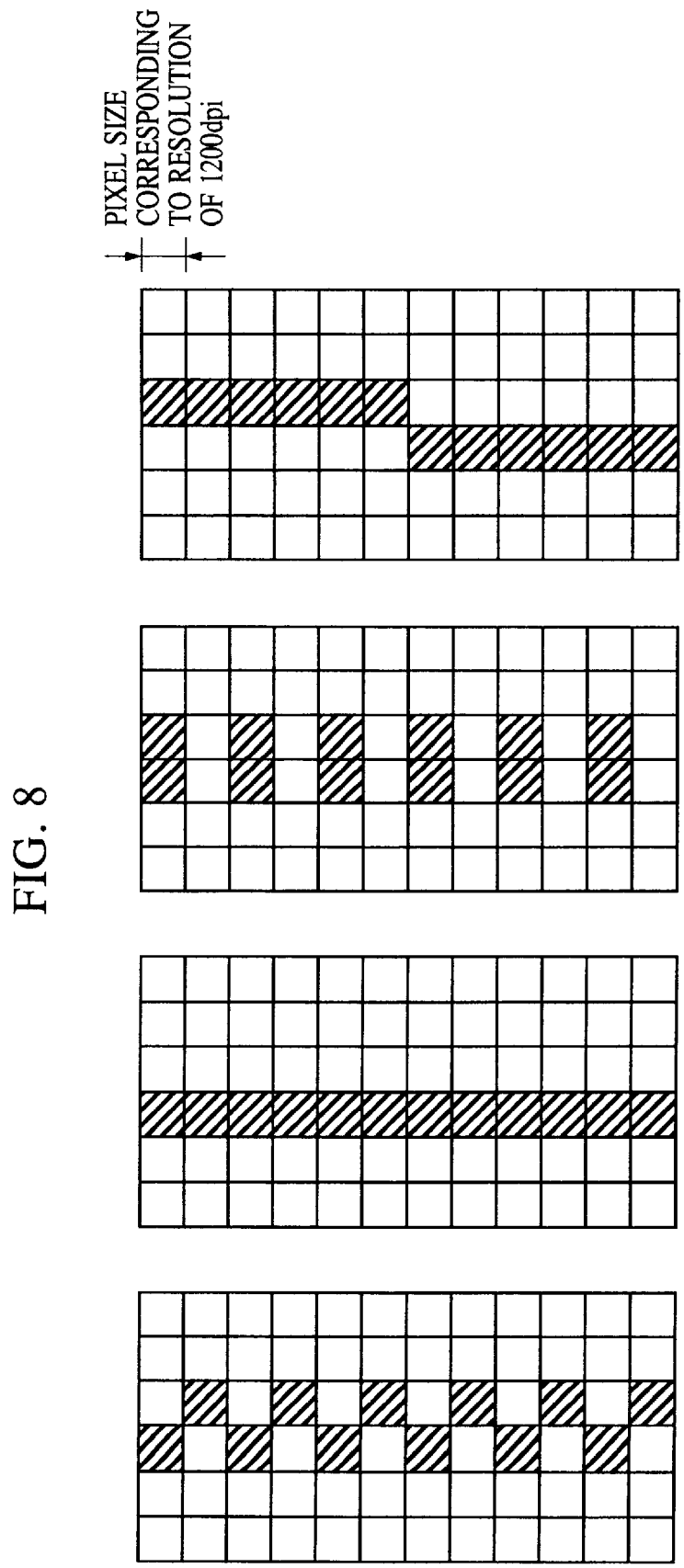
FIG. 8 is a diagram showing formed images of mark M in the case where the resolution is 1200 dpi.
Figure 11A:
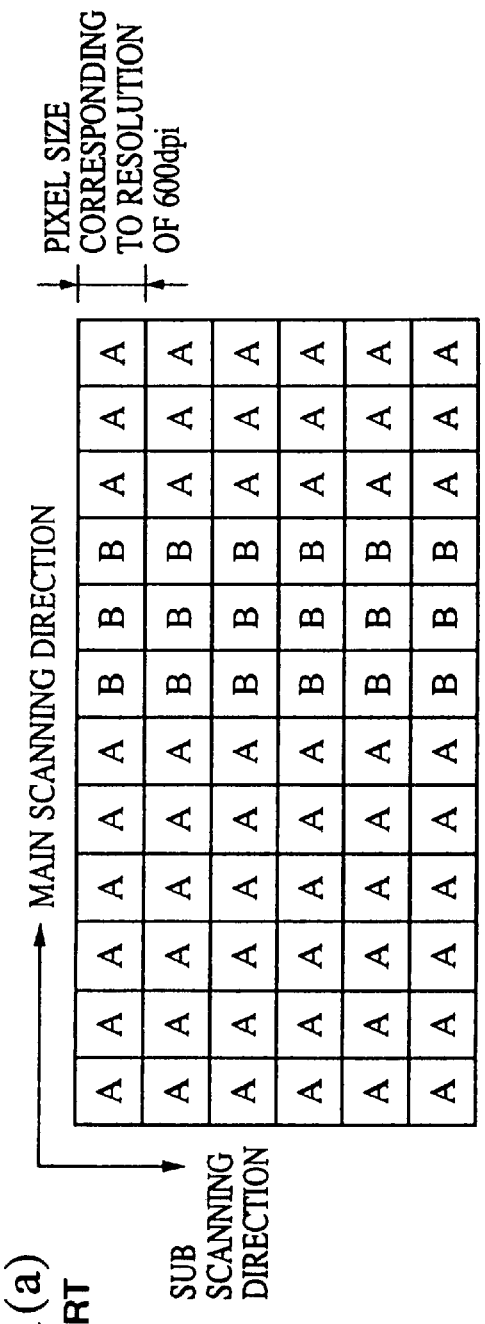
FIGS. 11(a) and 11(b) are diagrams of a modulation signal for adding mark M at a resolution of 600 dpi and dots expressing two-valued mark M in accordance with the conventional method.
Figure 11B:
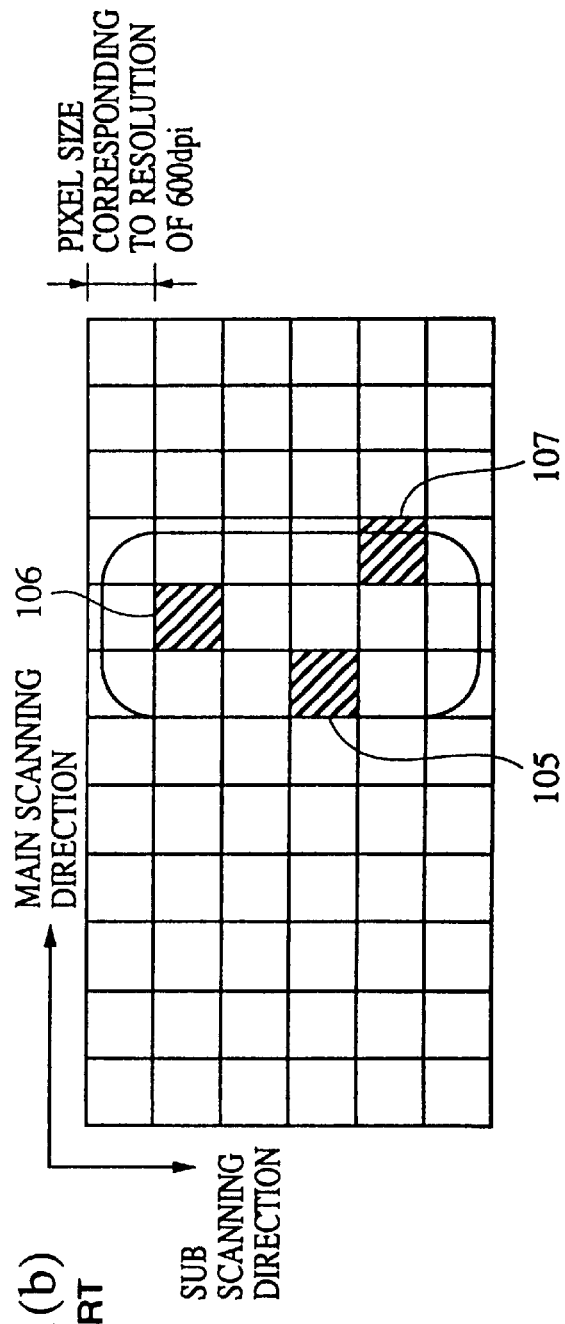

The present invention has been described with respect to the case where the resolution of a formed image is 600 dpi. However, the resolution in accordance with the present invention is not limited to this. For example, the resolution may be increased to 800 dpi and to 1200 dpi. FIGS. 7 and 8 show formed images of marks M in the case where the resolution is set to 800 dpi and the case where the resolution is set to 1200 dpi. In the case of 800 dpi, mark M is formed by 5 or 6 dots, as shown in FIG. 7. In the case of 1200 dpi, mark M is formed by about 12 dots, as shown in FIG. 8. In either case, mark M is formed as a pattern definitely discriminable from a texture which appears when an ordinary image is two-valued.

The embodiment of the invention has been described with respect to the case of adding marks M only in the Y component in the four color components (C, M, Y, Bk) of the density signal, i.e., the component most difficult to visually recognize. However, the present invention is not limited to this kind of processing and, needless to say, marks M are not exclusively added in the Y component. For example, marks M may be added in a comparatively light color which is visually inconspicuous and which is selected from other color components in a different image forming system, such as an ink jet system. Further, marks M are not exclusively added in only one color component; marks M may be added in a plurality of color components.

The present invention has been described with respect to a multicolor copying machine having a external input interface. However, the present invention is not applied exclusively to this king of apparatus. For example, the present invention can also be applied to a printer and a facsimile apparatus.

According to the above-described embodiment of the present invention, predetermined information is added to input digital multivalued data or image data quantized by pseudo halftone processing, for example. An image is formed on the basis of the image data to which the predetermined information has been added and which has been quantized. The predetermined information is added so that the positions of pixels representing the added information are not changed by quantization. Therefore, the added information can be read from the formed image always reliably.

The present invention may be applied to a system formed of a plurality of apparatuses, e.g., an image scanner and a printer or may be applied to an apparatus consisting of a single machine such as a copying machine or a printer. Needless to say, the present invention can also be applied to a process for achieving the same effect by supplying a program recorded on a recording medium to a system or an apparatus.

The recording means in accordance with the present invention is not limited to the electrophotography system using a laser. The present invention is also applicable to any other recording systems, including electrophotography systems using solid-state recording devices, such as light emitting diodes and light crystal display devices and ink jet recording systems. Further, the recording means is not limited to those for recording by using two-valued data and may comprise means for recording by using data quantized by three-valued or four-valuing input digital multivalued data. Also, a halftone image may be expressed by performing pulse width modulation.

The addition means adds information by using a combination of a maximum density value and a minimum density value. However, it is not always necessary to use such values set to "00 (in sexadecimal notation)" and "FF (in sexadecimal notation)" of 256 gradations. Any other data capable of substantially expressing a maximum value and a minimum value may also be used.

Image data having N values (N≧2) may suffice as the object of pattern addition. In particular, addition object data may be two-valued data and supplied from an external unit, such as a host computer.

According to the present invention, as described above, an image processing method and an image processing apparatus using the method can be provided which enable information to be added particularly to a two-valued image having a high resolution so as to be easily decipherable.

While the present invention has been described with respect to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   input means for inputting multivalued digital image data;
   addition means for adding predetermined information to the multivalued digital image data input by said input means; and
   quantization means for quantizing the multivalued digital image data to which the predetermined information has been added,
   wherein said addition means adds the predetermined information so that a position of at least one pixel expressing the added information is not changed due to the quantization performed by said quantization means.

2. An apparatus according to claim 1, wherein the multivalued image data comprises density data expressed by a plurality of color components, and
   wherein said addition mean adds the predetermined information to the density data of one color component in the plurality of color components.

3. An apparatus according to claim 2, wherein the one color component to which said addition means adds the predetermined information is a color component difficult to discriminate by human vision.

4. An apparatus according to claim 2, wherein said addition means comprises:
   modulation means for modulating the density data so that a density value of the color component of the density data as the object of addition of the information is increased; and
   modulation control means for controlling said modulation means so that modulation is effected at a predetermined position by said modulation means.

5. An apparatus according to claim 4, wherein the modulation is performed so as to set a maximum density value expressible by the multivalued image data.

6. An apparatus according to claim 1, wherein said quantization means two-values the image data by pseudo halftone processing.

7. An apparatus according to claim 6, wherein the pseudo halftone processing comprises processing based on one of a dither method and an error diffusion method.

8. An apparatus according to claim 1, wherein the added information is expressed by a plurality of pixels in a two-valued image formed by image forming means, and the positional relationship between the plurality of pixels is constantly maintained irrespective of the input multivalued image data.

9. An apparatus according to claim 1, wherein said apparatus comprises at least one of a printer, a copying machine and a facsimile machine.

10. An apparatus according to claim 1, wherein the predetermined information comprises information determined by a manufacturer or a provider to enable the apparatus to be identified.

11. An image processing method comprising:
   an input step of inputting multivalued digital image data;
   an addition step of adding predetermined information to the multivalued digital image data input in said input step; and
   a quantization step of quantizing the multivalued image data to which the predetermined information has been added,
   wherein, in said addition step, the predetermined information is added so that a position of at least one pixel expressing the added information is not changed due to the quantization in said quantization step.

12. An image processing apparatus comprising:
   input means for inputting image data;
   quantization means for quantizing the image data; and
   addition means for adding predetermined information to an image represented by the image data,
   wherein said addition means adds the predetermined information by using a combination of a substantially maximum density value and a substantially minimum density value representable by the image data.

13. An apparatus according to claim 12, wherein the image data comprises image data having N values ($N \geq 2$).

14. An apparatus according to claim 12, wherein the image data comprises density data expressed by a plurality of color components, and wherein said addition means adds the predetermined information to multivalued density data of one of the plurality of color components.

15. An apparatus according to claim 14, wherein the one color component to which said addition means adds the predetermined information is a color component difficult to discriminate by human vision.

16. An apparatus according to claim 15, wherein said addition means comprises;
   modulation means for modulating the density data by at least one of adding a predetermined density value to the multivalued data of the color component as the object of addition of the information and subtracting a predetermined density value for the multivalued data of the color component as the object of addition of the information; and
   modulation control means for controlling said modulation means so that modulation is effected at a predetermined position by said modulation means.

17. An apparatus according to claim 12, wherein said addition means combines pixels having the maximum density value and pixels having the minimum density value so that at least two of the pixels are successively disposed adjacent one to another in a predetermined direction.

18. An apparatus according to claim 17, wherein said predetermined direction corresponds to a sub scanning direction.

19. An apparatus according to claim 17, wherein any one of adjacent pairs of the pixels combined by said addition means have only one of the maximum density value and the minimum density value.

20. An apparatus according to claim 17, wherein the number of successive pixels having the minimum density value is smaller than the number of successive pixels having the maximum density value.

21. An image processing method comprising:
   an input step of inputting image data;
   a quantizing step of quantizing the image data; and
   an addition step of adding predetermined information to an image represented by the image data,
   wherein, in said addition step, the predetermined information is added by using a combination of a substantially maximum density value and a substantially minimum density value representable by the image data.

22. An image processing apparatus comprising:
   input means for inputting image data; and
   addition means for adding predetermined information to an image represented by the image data;
   wherein said addition means adds the predetermined information by using combination of a plurality of density values unevenly arranged relative to a predetermined line.

23. An apparatus according to claim 22, wherein the predetermined line is composed of pixels having one of the density values.

24. An apparatus according to claim 23, wherein pixels having another density value are unevenly arranged relative to the predetermined line.

25. An apparatus according to claim 22, wherein the image data comprises image data having N values ($N \leq 2$).

26. An apparatus according to claim 22, wherein the image data comprises density data expressed by a plurality of color components, and wherein said addition means adds the predetermined information to multivalued density data of one of the plurality of color components.

27. An apparatus according to claim 26, wherein the one color component to which said addition means add the predetermined information is a color component difficult to discriminate by human vision.

28. An apparatus according to claim 27, wherein said addition means comprises:

modulation means for modulating the density data by at least one of adding a predetermined density value to the multivalued data of the color component as the object of addition of the information and subtracting a predetermined density value from the multivalued data of the color component as the object of addition of the information; and modulation control means for controlling said modulation means so that modulation is effected at a predetermined position by said modulation means.

29. An apparatus according to claim 22, wherein said addition means combines pixels having the maximum density values and pixels having the minimum density value so that at least two of the pixels are successively disposed adjacent one to another in a predetermined direction.

30. An apparatus according to claim 29, wherein said predetermined direction corresponds to a sub scanning direction.

31. An apparatus according to claim 29, wherein any one of adjacent pairs of the pixels combined by said addition means have only one of the maximum density value and the minimum density value.

32. An apparatus according to claim 29, wherein the number of successive pixels having the minimum density value is smaller than the number of successive pixels having the maximum density value.

33. An image processing method comprising:

an input step of inputting image data; and an addition step of adding predetermined information to an image represented by the image data, wherein, in said addition step, the predetermined information is added by using a combination of a plurality of density values unevenly arranged relative to a predetermined line.

* * * * *

UNITED STATES PATENT AND TRADEMARK OFFICE
CERTIFICATE OF CORRECTION

PATENT NO. : 6,002,841
DATED : December 14, 1999
INVENTOR(S): HIROSHI TANIOKA

It is certified that error appears in the above-identified patent and that said Letters Patent is hereby corrected as shown below:

COLUMN 5

Line 5, "apparatus" should read --apparatuses--.
    Line 33, "scanner" should read --scanning--.
    Line 41, "(BK)" should read --(Bk),--.
    Line 53, "device 28" should read --device 218--.

COLUMN 6

Line 2, "FIG. 2" should read --FIG. 2A--.
    Line 51, "kinds" should read --kind--.

COLUMN 7

Line 39, "of "B"," should read --or "B",--.

COLUMN 9

Line 63, "king" should read --kind--.

UNITED STATES PATENT AND TRADEMARK OFFICE
CERTIFICATE OF CORRECTION

PATENT NO. : 6,002,841

DATED : December 14, 1999

INVENTOR(S): HIROSHI TANIOKA

It is certified that error appears in the above-identified patent and that said Letters Patent is hereby corrected as shown below:

COLUMN 10

Line 25, "three-valued" should read --three-valuing--.

COLUMN 11

Line 4, "mean" should read --means--.

COLUMN 12

Line 8, "comprises;" should read --comprises:--.
Line 29, "have" should read --has--.
Line 47, "data;" should read --data,--.
Line 50, "combination" should read --a combination--.
Line 60, "$(N \leq 2)$." should read --$(N \geq 2)$.--.
Line 67, "add" should read --adds--.

COLUMN 13

Line 17, "values" should read --value--.

UNITED STATES PATENT AND TRADEMARK OFFICE
CERTIFICATE OF CORRECTION

PATENT NO. : 6,002,841

DATED : December 14, 1999

INVENTOR(S): HIROSHI TANIOKA

It is certified that error appears in the above-identified patent and that said Letters Patent is hereby corrected as shown below:

<u>COLUMN 14</u>

Line 5, "have" should read --has--.

Signed and Sealed this

Twenty-seventh Day of March, 2001

Attest:

NICHOLAS P. GODICI

Attesting Officer       Acting Director of the United States Patent and Trademark Office